(12) United States Patent
Tan et al.

(10) Patent No.: US 9,785,544 B2
(45) Date of Patent: Oct. 10, 2017

(54) TESTING A MOBILE APPLICATION

(71) Applicant: International Business Machines Corporation, Armonk, NY (US)

(72) Inventors: Shuai B J Tan, Beijing (CN); Dejun Wang, Beijing (CN); Jin Qiang Wu, Beijing (CN); Jing Wu, Beijing (CN); Qiu Xia Zhao, Beijing (CN)

(73) Assignee: International Business Machines Corporation, Armonk, NY (US)

(*) Notice: Subject to any disclaimer, the term of this patent is extended or adjusted under 35 U.S.C. 154(b) by 77 days.

(21) Appl. No.: 14/800,026

(22) Filed: Jul. 15, 2015

(65) Prior Publication Data

US 2016/0062879 A1 Mar. 3, 2016

(30) Foreign Application Priority Data

Aug. 29, 2014 (CN) .......................... 2014 1 0436807

(51) Int. Cl.
*G06F 11/263* (2006.01)
*G06F 11/36* (2006.01)

(52) U.S. Cl.
CPC ...... *G06F 11/3688* (2013.01); *G06F 11/3664* (2013.01)

(58) Field of Classification Search
USPC .......................................................... 714/28
See application file for complete search history.

(56) References Cited

U.S. PATENT DOCUMENTS

| 8,315,655 | B1 | 11/2012 | Cole |
| 8,418,000 | B1 | 4/2013 | Salame |
| 8,566,648 | B2 | 10/2013 | Schroeder |
| 8,719,818 | B2 | 5/2014 | Chen et al. |
| 8,856,748 | B1* | 10/2014 | Larsen ............... G06F 11/3668 717/125 |

(Continued)

OTHER PUBLICATIONS

Mobile Device Testing, Cloud-based test solution for device testing, URL:http://www.google.co.in/url?sa=t&rct=j&q=&esrc=s&source=web&cd=1&ved=0CEMQFjAA&url=http%3A%2F%2Fwww.communology.com%2Ffileadmin%2Fpdf_press_releases%2Fbrochure_communology_mte.pdf&ei=vmKJU5PZEcvi8AXTgoLQCw&usg=AFQjCNGYxbfMU1rMELstnqxhD0kMhnZo7Q&bvm=bv.67720277,d.dGc&cad=rja, 3 pages.

(Continued)

*Primary Examiner* — Kamini Patel
(74) *Attorney, Agent, or Firm* — Schmeiser, Olsen & Watts, LLP; John Pivnichny

(57) ABSTRACT

The present invention discloses a manager, a test agent installed on a personal mobile device and methods thereof. The manager comprises: a first network connection module configured to establish a connection with the mobile device through Internet, the mobile device being installed with a test agent for performing test operation on a mobile application on the mobile device; and a security module configured to communicate with the test agent through the first network connection module to make the test agent perform security control on the mobile device. According to the manager, mobile devices, and methods of the present invention, the cost such as maintenance cost of the data center and purchase cost of mobile devices can be reduced dramatically. It is not necessary to analyze market demands since mobile devices owned by the users of the mobile devices are the mobile devices that need to be tested by the tester.

20 Claims, 9 Drawing Sheets

(56) References Cited

U.S. PATENT DOCUMENTS

| | | | | |
|---|---|---|---|---|
| 8,881,111 | B1* | 11/2014 | Smith | G06F 11/3692 |
| | | | | 717/125 |
| 9,154,611 | B1* | 10/2015 | Jackson | H04L 41/0253 |
| 9,268,671 | B2* | 2/2016 | Chea | G06F 11/3664 |
| 9,501,390 | B1* | 11/2016 | Chellappa | G06F 11/3692 |
| 2008/0155343 | A1* | 6/2008 | Branca | G06F 11/3688 |
| | | | | 714/38.14 |
| 2012/0198279 | A1* | 8/2012 | Schroeder | G06F 11/3672 |
| | | | | 714/32 |
| 2012/0221893 | A1 | 8/2012 | Bai et al. | |
| 2012/0296983 | A1 | 11/2012 | Boehm | |
| 2013/0019242 | A1* | 1/2013 | Chen | H04L 41/145 |
| | | | | 718/1 |
| 2014/0026122 | A1 | 1/2014 | Markande et al. | |
| 2014/0095933 | A1* | 4/2014 | Griesinger | G06F 11/3676 |
| | | | | 714/32 |
| 2014/0237455 | A1* | 8/2014 | Koneru | G06F 11/3688 |
| | | | | 717/131 |

OTHER PUBLICATIONS

Muccini et al., Software Testing of Mobile Applications: Challenges and Future Research Directions, 978-1-4673-1822-8/12, 2012, IEEE, pp. 29-35.

Mike Ebbers, IBM, Cloud Computing: Save Time, Money, and Resources with a Private Test Cloud, Redbooks, Oct. 6, 2009, 22 pages.

* cited by examiner

TESTING A MOBILE APPLICATION

TECHNICAL FIELD

The present invention relates to the cloud computing technology, and more specifically, to a manger, a test agent and corresponding methods for testing a mobile application (program).

BACKGROUND

Currently, in order to ensure the applicability of a mobile application program, it is necessary to test the mobile application program on a mobile device before such mobile device is put into use. Such tests are all based on actual devices, but not on simulators. All mobile devices for mobile application testing are provided by service providers or testers themselves, and are positioned in a data center for testing. The type and the number of such mobile devices are both limited. In addition, the service provider and the tester need to track and analyze current mainstream mobile devices, in order to order new mobile devices to meet the test needs.

BRIEF SUMMARY

The present invention provides a manager. The manager includes a first network connection module and a security module. The first network connection module is configured to establish a connection with personal mobile devices through Internet, wherein the mobile device is installed with a test agent for performing test operation on a mobile application on the mobile device. The security module is configured to communicate with the test agent through the first network connection module to make the test agent perform security control on the mobile device.

The present invention provides a management method that includes: establishing a connection with a personal mobile device through Internet, wherein the mobile device is installed with a test agent for performing a test operation on a mobile application on the mobile device; and communicating with the test agent to make the test agent perform security control on the mobile device.

The present invention provides a test agent installed on a mobile device. The test agent is configured to control the mobile device to perform test operations on a mobile application. The test agent includes a second network connection module configured to establish a connection with a manager through Internet, wherein the test agent is configured to communicate with the manager through the second network connection module to perform security control on the mobile device.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
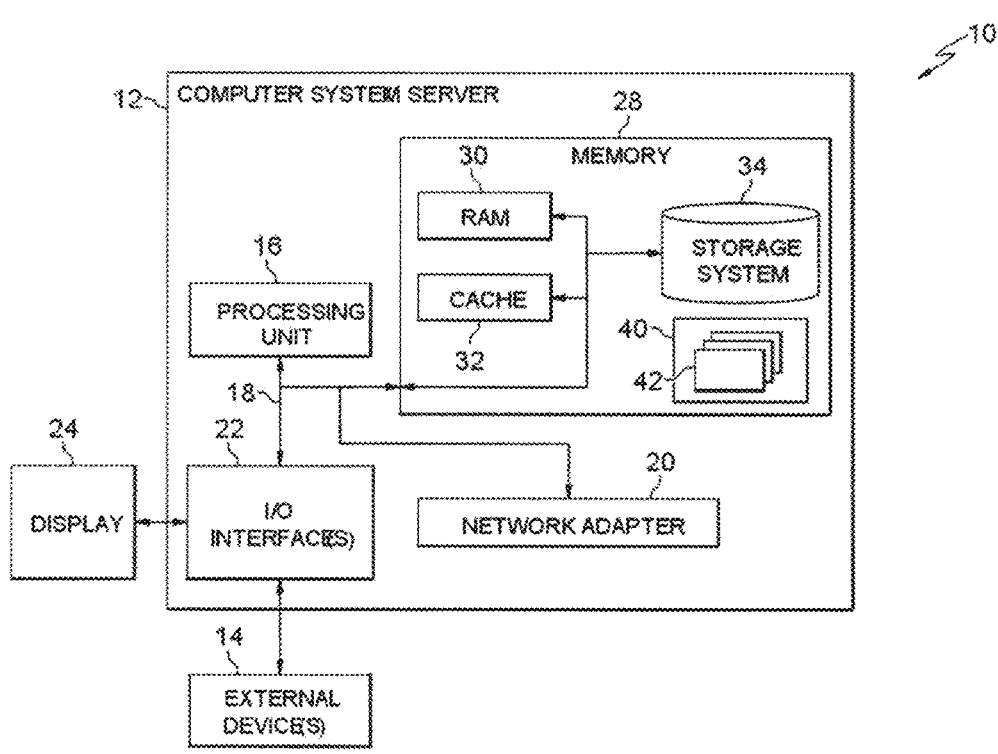
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Maintenance of the data center and purchase of mobile devices require high cost, and since there are too many kinds of mobile devices, the number and the type of the purchased mobile devices are limited, which can cover only a part of major types. In addition, the service provider and the tester are required to track and analyze the market of current mainstream mobile devices to order new mobile devices. Therefore, there is a high risk when purchasing new mobile devices existing in the market.

The present disclosure provides a new operation mode which is to establish a mobile device cloud system that can take sufficient advantage of idle time of mobile devices (e.g. mobile phones, pad computers) of enormous end users to test mobile applications while ensuring enough security control in practical environments of different end users.

According to one embodiment of the present invention, there is provided a manager comprising: a first network connection module configured to establish connection with personal mobile devices through Internet, wherein the mobile device is installed with a test agent for performing test operation on a mobile application on the mobile device; and a security module configured to communicate with the test agent through the first network connection module to make the test agent perform security control on the mobile device.

According to another embodiment of the present invention, there is provided a management method comprising: establishing connection with personal mobile devices through internet, wherein the mobile device is installed with a test agent for performing test operation on a mobile application on the mobile device; and communicating with the test agent to make the test agent perform security control on the mobile device.

According to yet another embodiment of the present invention, there is provided a test agent installed on a mobile device, the test agent being configured to control the mobile device to perform test operation on a mobile application and comprising: a second network connection module configured to establish connection with a manager through Internet, wherein the test agent is configured to communicate with the manager through the second network connection module to perform security control on the mobile device.

According to yet another embodiment of the present invention, there is provided a method performed in a mobile device, comprising: establishing connection between the mobile device and a manager through Internet; installing a test agent on the mobile device to control the mobile device to test a mobile application; and communicating with the manager by use of the test agent to perform security control on the mobile device.

According to yet another embodiment of the present invention, there is provided a method performed in a mobile device, comprising: connecting the mobile device to a manager through Internet; registering information of the mobile device to the manager; performing security control to backup user data and/or application environment of the mobile device; and confirming that the mobile device is eligible to test a mobile application.

According to yet another embodiment of the present invention, there is provided a computer program product for testing mobile applications. The computer program product comprises a storage medium which can be accessed by a computer and store instructions which are executed by the computer to perform each step of the methods for testing mobile applications provided by the above embodiments of the present invention.

According to systems, methods and devices of embodiments of the present invention, the cost such as maintenance cost of the data center and purchase cost of mobile devices can be reduced dramatically; it is not necessary to analyze market demands since mobile devices owned by the users of the mobile devices are the mobile devices that need to be tested by the tester, and thus it is possible to support testing mobile applications on more types of mobile devices with more genuine user environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include characteristics, service models, and deployment models.

The characteristics of the cloud model comprise: on-demand self-service, broad network access, resource pooling, rapid elasticity, and measured service.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The service models of the cloud model comprise: Software as a Service (SaaS), Platform as a Service (PaaS), and Infrastructure as a Service (IaaS), Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models of the cloud model comprise: a private cloud, a community cloud, and a public cloud.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). The community cloud may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/computer/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a computing device, according to an embodiment of the present invention. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
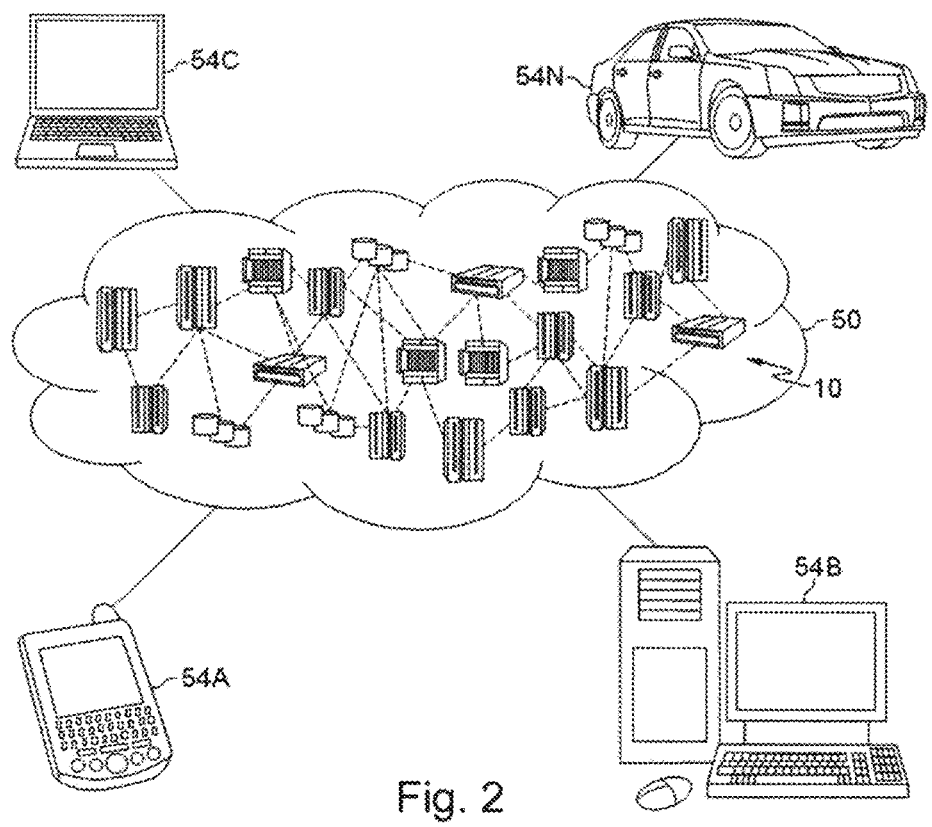
FIG. 2 depicts a cloud computing environment according to an embodiment of the present invention.

Referring now to FIG. 2, illustrative cloud computing environment 50 is depicted according to an embodiment of the present invention. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
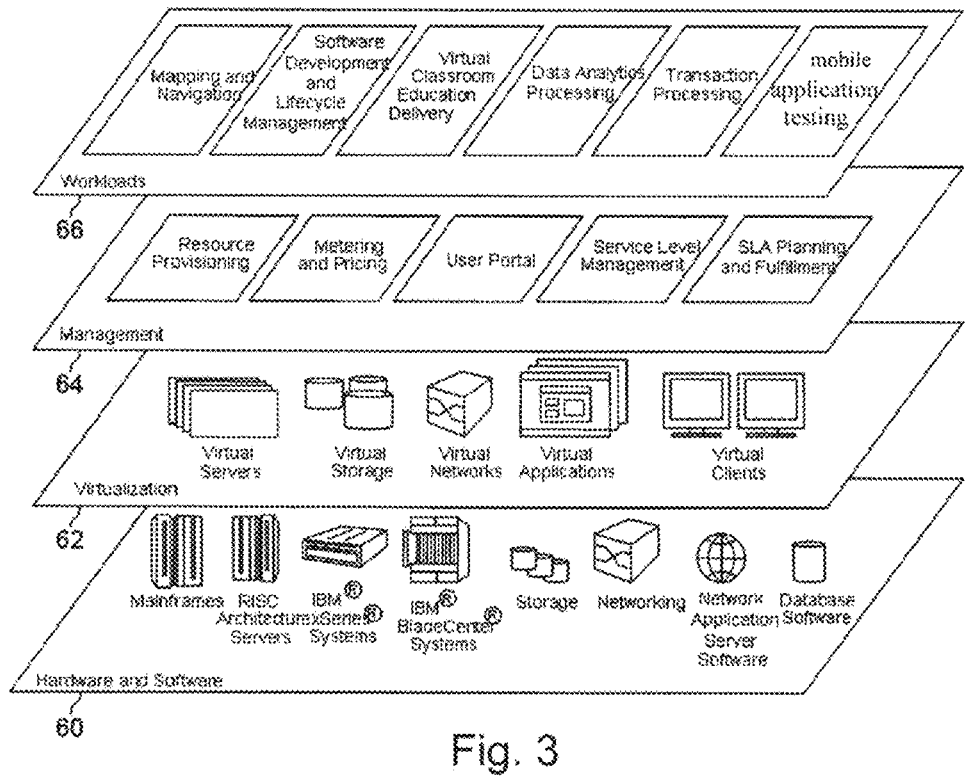
FIG. 3 depicts abstraction model layers according to an embodiment of the present invention.

Referring now to FIG. 3, a set of functional abstraction layers provided by cloud computing environment 50 (FIG. 2) is shown according to an embodiment of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile application testing.

In the present invention, a new business model is adopted, which utilizes mobile devices (e.g., mobile phones, flat pad computers) of actual end users to perform mobile application testing, such that the resources of the mobile devices of the end users in idle time can be utilized sufficiently.

According to an embodiment of the present invention, the mobile device can be connected to a local computer through wifi or USB, and the local computer is connected to the internet. In an example, the mobile device provider can be provided with credits, game points or the like as compensation. In an example, adequate security solution can be provided to protect user data and configurations of the mobile device. In an example, use and data recovery among others of the mobile device of the end user can be performed automatically.

Figure 4:
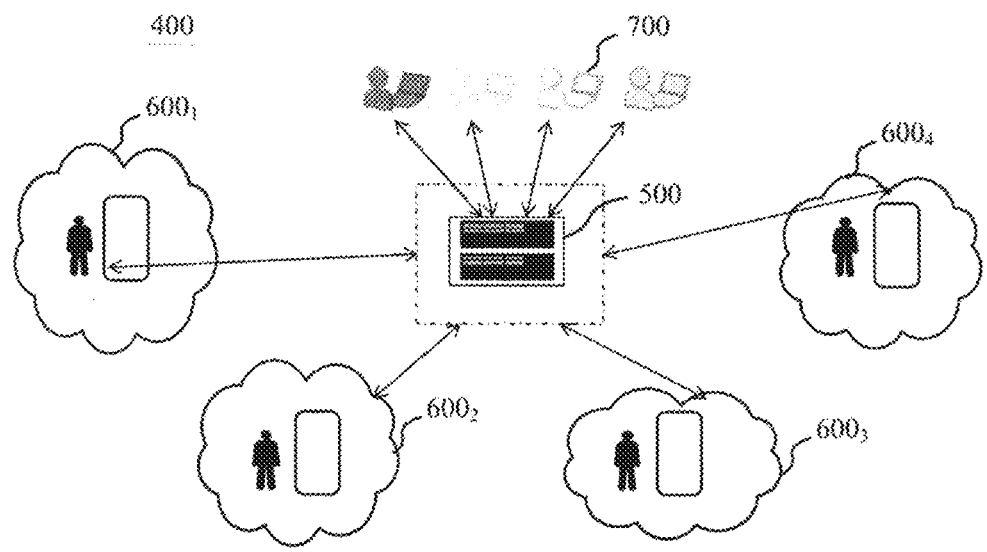
FIG. 4 depicts a cloud system for testing mobile applications according to an embodiment of the present invention.

FIG. 4 depicts a cloud system for testing mobile applications according to an embodiment of the present invention.

As shown in FIG. 4, the cloud system 400 for testing mobile applications according to an embodiment of the present invention comprises: a manager 500, multiple mobile devices $600_1$, $600_2$, $600_3$, $600_4$, and terminal devices 700 of testers of mobile devices. The manager 500 is configured to provide cloud service for testing mobile application to the testers. The multiple mobile devices $600_1$, $600_2$, $600_3$, $600_4$ are configured to be each installed with an included test agent. The test agent is configured to communicate with the manager 500 through Internet to perform test operation of the mobile application on each of the multiple mobile devices $600_1$, $600_2$, $600_3$, $600_4$ (which will be referred to as mobile device 600 uniformly unless a specific one is identified). In the above test operation, the test agent also performs security control on the mobile device 600.

According to an embodiment of the present invention, the test agent can be a software program which is installed and executed in the mobile device 600. Alternatively, the test agent can also be a hardware unit, such as an application specific integrated circuit (ASIC), configured to perform the test agent functionalities described herein in accordance with the present invention.

According to an embodiment of the present invention, the manager 500 can be a software program which is installed and executed in at least one physical server. The physical server can be a computer system/computer/server 10 as shown in FIG. 1. Thus, the processor 16 of the computer system/computer/server 10 in FIG. 1 may execute program code (i.e., software) of the manager 500. The mobile device 600 is a hardware device that can be a portable device used by the end user, such as a mobile phone (cell phone), a pad computer and so on. The terminal device 700 of the tester is a hardware device that can be a portable or non-portable device such as a pad computer, a notebook computer, a desktop computer, and so on. Thus, one or more processors may perform the methods of the present invention. For example, a processor of the terminal device 700 and the processor 16 of the computer system/computer/server 10 in FIG. 1 may perform the functionalities of the terminal device 700 and the functionalities of the computer system/computer/server 10, respectively.

Figure 5A:
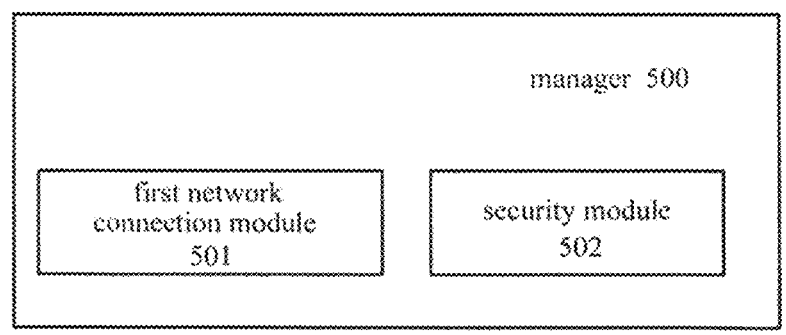
FIG. 5(a) is a block diagram illustrating a manager according to an embodiment of the present invention.
Figure 5B:
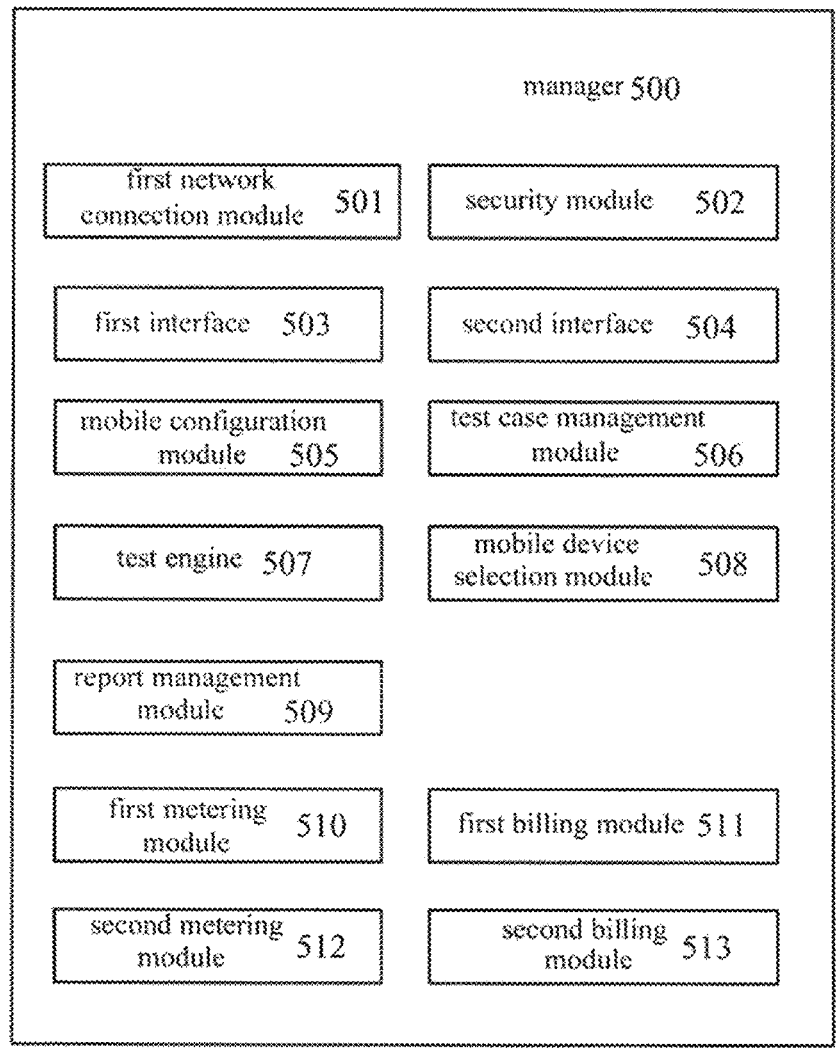
FIG. 5(b) is a block diagram illustrating a manager according to another embodiment of the present invention.

FIG. 5(*a*) is a block diagram illustrating a manager 500 according to an embodiment of the present invention.

As shown in FIG. 5(*a*), the manager 500 comprises a first network connection module 501 and a security module 502. The first network connection module 501 is configured to establish network connection with multiple personal mobile devices 600 through Internet, wherein the mobile device 600 is installed with a test agent for performing test operation on a mobile application on the mobile device 600. The security module 502 is configured to communicate with the test agent through the first network connection module 501 to perform security control on the mobile device 600 through the test agent.

According to an embodiment of the present invention, the security control is a security control performed on the mobile device 600 during the test operation on the mobile application.

According to an embodiment of the present invention, the security control comprises at least one of data backup and recovery and access permission configuration. The data backup and recovery refers to backing up user data (e.g. short message, contact list, call log) and application environment (data) to a storage at the cloud side or a storage of a local computer before the test and recovering the backed up user data and application environment after the test is finished. The access permission configuration refers to configuring the range of the resource in the mobile device 600 that can be accessed by the mobile application to be tested.

According to an embodiment of the present invention, performing security control on the mobile device 600 further comprises security authentication on the mobile device 600. For example, the security module 502 is also configured to perform security authentication on the mobile device 600 performing network connection with the manager 500, for example, checking and verifying the key input provided by the mobile device 600, and when the input key is coincident with the key pre-stored in the manager 500, allowing the mobile device 600 to access the manager 500.

FIG. 5(*b*) is a block diagram illustrating a manager 500 according to another embodiment of the present invention.

As shown in FIG. 5(*b*), in addition to the first network connection module 501 and the security module 502, the manager 500 according to another embodiment of the present invention can further comprise: a first interface 503 for logon through the test agent and a second interface 504 for logon through a terminal device 700 of the tester of the mobile application displayed on a display apparatus (not shown) of the mobile device 600. According to an embodiment of the present invention, the first interface 503 of the manager 500 can be logged on remotely by the provider of the mobile device 600, and the mobile device 600 can be registered in the manager 500 through the first interface 503. The second interface 504 can be logged on remotely by the tester testing the mobile application through the terminal device 700 to perform test management operation on the mobile application.

According to an embodiment of the present invention, the manager 500 can further comprise a mobile configuration module 505 configured to receive configuration of service time available for testing the mobile application of the mobile device 600 by the individual user of the mobile device 600 through the first interface 503. Herein, the mobile device 600 is only available in the range of the service time for the terminal device 700 of the tester of the mobile application. In other words, the tester of the mobile application can find the mobile device 600 only in the range of the preconfigured available time (service time) of the mobile device 600.

According to the above embodiment, the first network connection module 501 is further configured to initiate the network connection in response to receiving a connection request from the test agent, and stop the network connection in response to the service time expiring.

According to an embodiment of the present invention, the manager 500 can further comprise a test case management module 506 configured to receive test cases from the tester of the mobile application through the second interface 504. The test cases specify what type of mobile devices and what number of mobile devices the tester hopes to select for testing the mobile application.

According to an embodiment of the present invention, the manager 500 can further comprise a test engine 507 configured to identify test platform requirements of each test case, configure necessary test environments for each test case based on the test platform requirements, and assign the mobile application to be tested and the test cases to the mobile device 600.

According to an embodiment of the present invention, the manager 500 can further comprise a mobile device selection module 508 configured to select available mobile devices 600 based on at least the type of the mobile devices 600 by logging on the second interface 504 through the terminal device 700. In particular, the mobile device selection module 508 is configured to provide the terminal device 700 of the tester of the mobile application with options of available mobile devices 600, and receive operations such as browsing, looking up, selecting or the like of the tester on the mobile devices 600. For example, the mobile device selection module 508 can present a list of available mobile devices 600 to the tester through the second interface 504. The list can show information such as specific type of the available mobile devices 600, model of the available mobile devices 600, number of the available mobile devices 600, distribution area in which of the available mobile devices 600 are distributed, the range of available time (service time) of the available mobile devices 600 for testing the mobile application, etc. The tester can select the mobile devices 600 to be used based on the above shown information of the mobile devices 600, such as type of the available mobile devices 600, model of the available mobile devices 600, number of the available mobile devices 600, the range of available time of the available mobile devices 600, etc.

According to the above embodiment, the first network connection module 501 is further configured to connect the test engine 507 and the selected mobile devices 600, push the test environment for each test case and the mobile application to be tested to the mobile devices 600, and collect test data from the mobile devices 600.

According to an embodiment of the present invention, the manager 500 can further comprise a report management module 509 configured to generate a test report based on the collected test data of all the used mobile devices 600 for the mobile application, provide the test report to the terminal device 700, and support the terminal device 700 to download and manage the test report.

According to another embodiment of the present invention, the manager 500 can further comprise a first metering module 510 configured to record (i.e., store) at least one of the following information of the mobile device 600: device type, model (kind), security level, service time, workload and so on.

According to another embodiment of the present invention, the manager 500 can further comprise a first billing module 511 configured to manage bills based on the metering data of the first metering module 510 and a preset price policy to pay the providers of mobile devices 600. Because the providers of mobile devices 600 provide their own mobile devices 600 to help the testing of the mobile application of the tester, the tester may pay for necessary cost to the providers of mobile devices 600, for example, bestow game points.

According to another embodiment of the present invention, the manager 500 can also comprise a second metering module 512 configured to record related information of all mobile devices 600 selected and used by the tester and the time range that these mobile devices 600 actually used for testing.

According to another embodiment of the present invention, the manager 500 can also comprise a second billing module 513 configured to manage bills based on the metering data of the second metering module 512 and a preset price policy to charge the tester for the cost of testing.

Figure 6A:
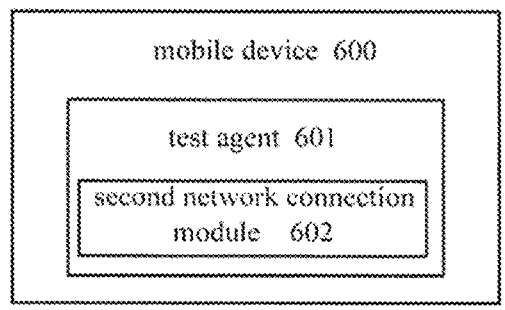
FIG. 6(a) is a block diagram illustrating a test agent installed on a mobile device according to an embodiment of the present invention.

FIG. 6(a) is a block diagram illustrating a test agent installed on a mobile device according to an embodiment of the present invention.

As shown in FIG. 6(a), the test agent 601 according to an embodiment of the present invention is installed (and executed) in the mobile device 600, and is configured to control the mobile device to test the mobile application. The test agent 601 can comprise a second network connection module 602 configured to establish connection with the manager 500 through Internet. In the present embodiment, the test agent 601 is configured to communicate with the manager 500 through the second network connection module 602 to perform security control on the mobile device 600.

According to an embodiment of the present invention, the second network connection module 602 is configured to send a connection request to the manager 500 through Internet, and register property information of the mobile device 600 to the manager 500 when having established network connection with the manager 500. According to an embodiment of the present invention, the property information of the mobile device 600 can comprise identity information, type or model information, quantity information and so on of the mobile device 600.

According to an embodiment of the present invention, the mobile device 600 can be connected to a local computer through wifi or USB interface, and the local computer can be connected to the Internet by wire, for example but not limited to telephone network, cable TV network or the like.

Figure 6B:
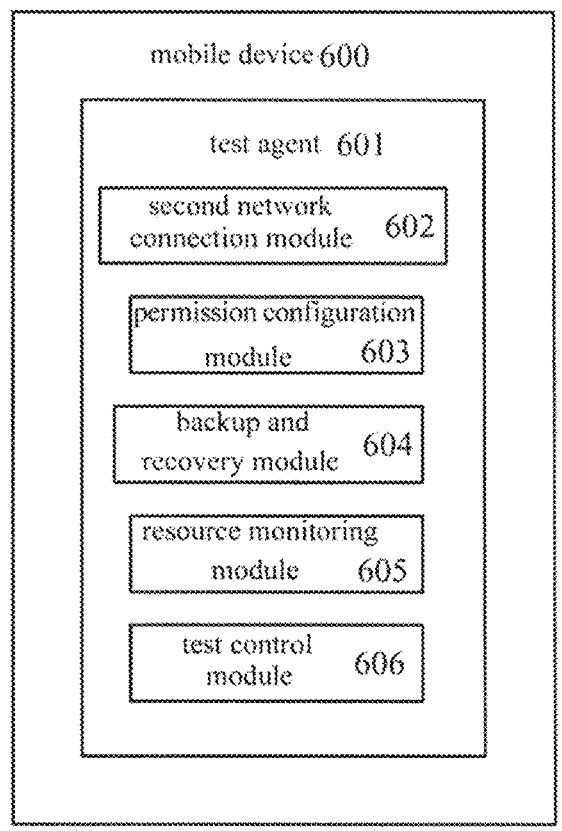
FIG. 6(b) is a block diagram illustrating a test agent installed on a mobile device according to another embodiment of the present invention.

FIG. 6(b) is a block diagram illustrating a test agent installed on a mobile device according to another embodiment of the present invention.

As shown in FIG. 6(b), the test agent 601 according to another embodiment of the present invention is installed (and executed) in the mobile device 600. In addition to the second network connection module 602, the test agent 601 can also comprise a permission configuration module 603 configured to configure the range of resources (e.g., short message, contact list, call log, network, GPS, application program, etc.) of the mobile device 600 that can be accessed by the mobile application to be tested. The permission configuration module 603 of the present embodiment can communicate with the security module 502 in the manager 500 to perform the above access permission configuration operations according to the instructions from the security module 502.

According to an embodiment of the present invention, the test agent 601 can also comprise a backup and recovery module 604 configured to backup user data (e.g., short message, contact list, call log, etc.) and application environment (data) of the mobile device 600 to a storage of the cloud side or a storage of the local computer before the test, and recover the backed up user data and application environment after the test. The backup and recovery module 604 of the present embodiment can communicate with the security module 502 in the manager 500 to perform the above data backup and recovery operations according to the instructions from the security module 502.

According to an embodiment of the present invention, the test agent 601 can also comprise a resource monitoring module 605 configured to monitor at least one of state, test time duration and resource consumption (e.g., temperature, CPU, internal memory, hard drive, electric power, network, etc.) of the mobile device during the test, and send monitoring data to the manager 500.

According to an embodiment of the present invention, the test agent 601 can also comprise a test control module 606 configured to perform at least one of the following operations: (1) configuring service time available for testing of the mobile device 600; (2) receiving the mobile application to be tested from the first network connection module 501 of the manager 500; (3) installing the mobile application to be tested into the mobile device 600; (4) initiating the mobile application; (5) controlling test script files of the mobile application; (6) interrupting or terminating the test according to monitored exceptions (e.g., temperature, CPU, internal memory, electric power, etc.); (7) removing the mobile application from the mobile device 600.

The mobile device 600 according to an embodiment of the present invention can also comprise (the following units are not shown in the figures): a central processing unit (CPU) for executing related programs to process various data and control the operations of respective means (units) of the mobile device 600; a read-only memory (ROM) for storing various programs required by CPU to perform various processing and controls; a random access memory (RAM) for storing intermediate data temporarily generated by CPU in the processing and control procedure; an input/output (I/O) means for connecting to the outside devices to transmit various data between an outside device and the mobile device 600 according to an embodiment of the present disclosure; and a user interface (I/F) means which comprises a keyboard, a mouse, a touch plate, and other means implemented by various display apparatuses or sound apparatuses that can interact with the user. These apparatuses or means can be coupled, by a data bus and/or a control bus, to the test agent 601, the second network connection module 602, the permission configuration module 603, the backup and recovery module 604, the resource monitoring module 605, the test control module 606 and so on of the mobile device 600 to perform various control and related operations to realize various corresponding functions of the present invention, in order to provide cloud service.

According to an embodiment of the present invention, the functions of the test agent 601, and the second network connection module 602, the permission configuration module 603, the backup and recovery module 604, the resource monitoring module 605 and the test control module 606 thereof can be realized by storing a program in the ROM and executing the program in the CPU to realize corresponding functions. According to an embodiment of the present invention, respective apparatuses, modules, and units of the mobile device 600 can be implemented by being combined to one unit. Their specific implementation does not limit the scope of the present invention.

Figure 7:
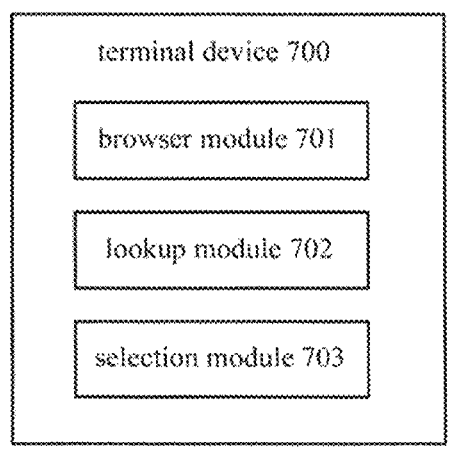
FIG. 7 is a block diagram illustrating a terminal device of a tester for testing mobile applications according to an embodiment of the present invention.

FIG. 7 is a block diagram illustrating a terminal device of a tester for testing mobile applications according to an embodiment of the present invention.

As shown in FIG. 7, the terminal device 700 of a tester for testing mobile applications according to an embodiment of the present invention comprises a browser module 701, a lookup module 702 and a selection module 703. According to another embodiment of the present invention, the terminal device 700 can further comprise a report obtaining module and/or a payment module (not shown).

The browser module 701 is configured to be provided to the tester, and the tester logs on for example the second interface 504 of the manager 500 through the browser module 701. The lookup module 702 is configured to look up available mobile devices 600 by the tester browsing on the second interface 504 of the manager 500. The selection module 703 is configured such that the tester selects the mobile devices 600 to be used among the found available mobile devices 600 to test the mobile application.

According to another embodiment of the present invention, the report obtaining module in the terminal device 700 is configured to obtain the test report from the manager 500, for example, download the test report from the manager 500 and manage the test report. The payment module in the terminal device 700 is configured to pay the service provider operating the manager 500 and/or the providers of the mobile devices 600.

The terminal device 700 according to an embodiment of the present invention may be a computer that can also comprise (the following units are not shown in the figures): a central processing unit (CPU) for executing related programs to process various data and control the operations of respective means (units) in the terminal device 700; a read-only memory (ROM) for storing various programs required by CPU to perform various processing and controls; a random access memory (RAM) for storing intermediate data temporarily generated by CPU in the processing and control procedure; an input/output (I/O) means for connecting to the outside devices to transmit various data between an outside device and the terminal device 700 according to an embodiment of the present disclosure; and a user interface (I/F) means which comprises a keyboard, a mouse, a touch plate, and other means implemented by various display apparatuses or sound apparatuses that can interact with the user. These apparatuses or means can, through a data bus and/or control bus, be coupled to the browser module 701, the lookup module 702, the selection module 703, the report obtaining module, the payment module and so on in the terminal device 700 to perform various control and related operations to realize various corresponding functions of the present invention, in order to provide cloud service.

According to an embodiment of the present invention, the functions of the browser module 701, the lookup module 702, the selection module 703, the report obtaining module, the payment module and so on can be realized by storing a program in the ROM and executing the program in the CPU to realize corresponding functions. According to an embodiment of the present invention, respective apparatuses, modules, and units in the terminal device 700 can be implemented by being combined to one unit. Their specific implementation does limit the scope of the present invention.

Figure 8:
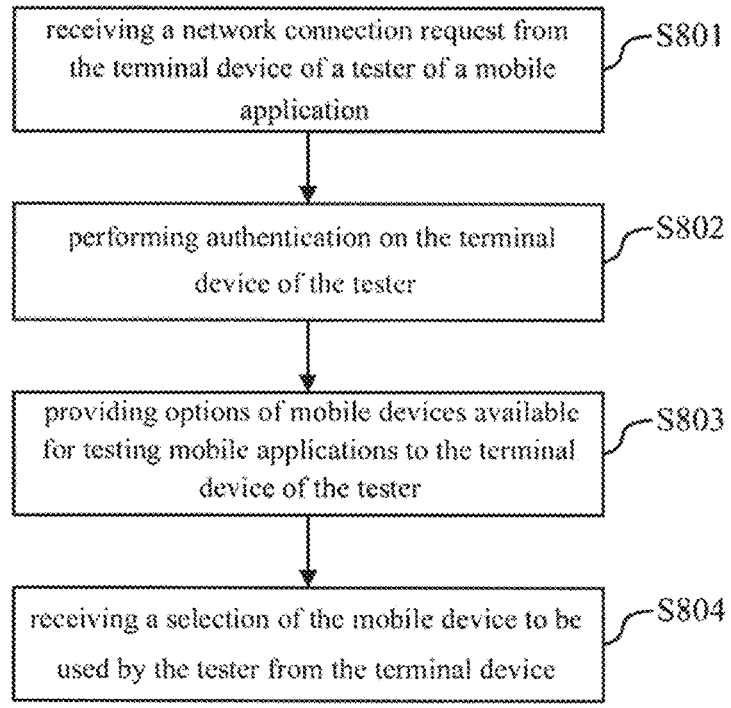
FIG. 8 is a flowchart illustrating a method performed in a manager according to an embodiment of the present invention.

FIG. 8 is a flowchart illustrating a method performed in a manager according to an embodiment of the present invention.

As shown in FIG. 8, at the step S801, a network connection request is received from the terminal device 700 of a tester of a mobile application. At the step S802, authentication is performed on the terminal device 700 of the tester. At the step S803, options of (i.e., a list of) mobile devices 600 available for testing mobile applications are provided to the terminal device 700 of the tester. At the step S804, a selection of the mobile device (i.e., one or more of the mobile devices 600) to be used by the tester is received from the terminal device 700. According to an embodiment of the present invention, the tester selects the mobile device 600 to be used based on information such as type, service time (range), quantity and so on of the mobile devices 600.

According to an embodiment of the present disclosure, the above method can further comprise a step of generating a test report based on the test result of the mobile application by the mobile device 600.

According to an embodiment of the present disclosure, the above method can also comprise a step of performing bill management to charge the tester and pay the providers of the mobile devices 600.

Figure 9:
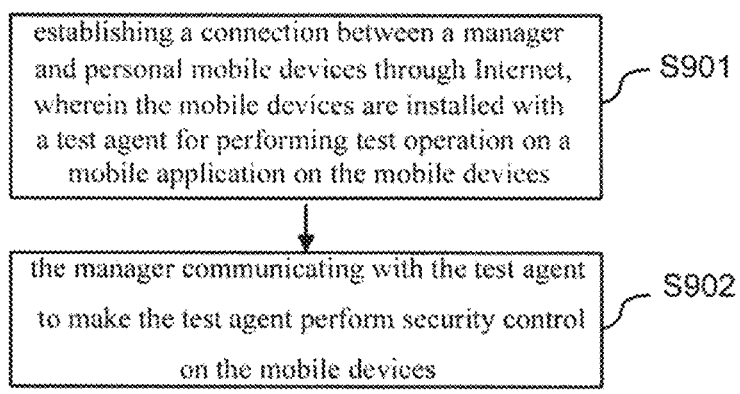
FIG. 9 is a flowchart illustrating a method performed in a manager according to another embodiment of the present invention.

FIG. 9 is a flowchart illustrating a method performed in a manager according to another embodiment of the present invention.

As shown FIG. 9, at the step S901, a connection is established between the manager 500 and a personal mobile device 600 through the Internet, wherein the mobile device 600 is installed with a test agent for performing test operation on a mobile application on the mobile device 600. At the step S902, the manager 500 communicates with the test agent to make the test agent perform security control on the mobile device 600.

According to an embodiment of the present invention, the above security control is a security control performed on the mobile device during the test operation on the mobile application.

According to an embodiment of the present invention, the above method further comprises at least one of the following steps: data backup and recovery, and access permission configuration. According to an embodiment of the present invention, the manager 500 has a first interface for logon through the test agent and a second interface for logon through a terminal device 700 of the tester of the mobile application.

According to an embodiment of the present invention, the above method further comprises a step of configuring the service time available for testing of the mobile device 600 by the test agent logging on the first interface, wherein the mobile device 600 is available only in the range of the service time.

According to an embodiment of the present invention, the above method further comprises steps of initiating the network connection in response to receiving a connection request from the test agent, and stopping the network connection in response to the service time expiring.

According to an embodiment of the present invention, the above method further comprises a step of uploading and managing test cases by the terminal device 700 logging on the second interface 504 of the manager 500.

According to an embodiment of the present invention, the above method further comprises a step of identifying test platform requirements of each of the test cases, configuring necessary test environments based on the test platform requirement, and assigning the mobile application to be tested and the test cases to the mobile device 600.

According to an embodiment of the present invention, the above method further comprises a step of selecting available mobile devices based on at least the type of the mobile devices 600 by logging on the second interface through the terminal device 700.

According to an embodiment of the present invention, the above method further comprises steps of connecting the test engine and the selected mobile devices 600, pushing the mobile application to be tested to the mobile devices 600, and collecting test data from the mobile devices.

According to an embodiment of the present invention, the above method further comprises steps of generating a test report based on the test data, and providing the test report to the terminal device 700.

Figure 10:
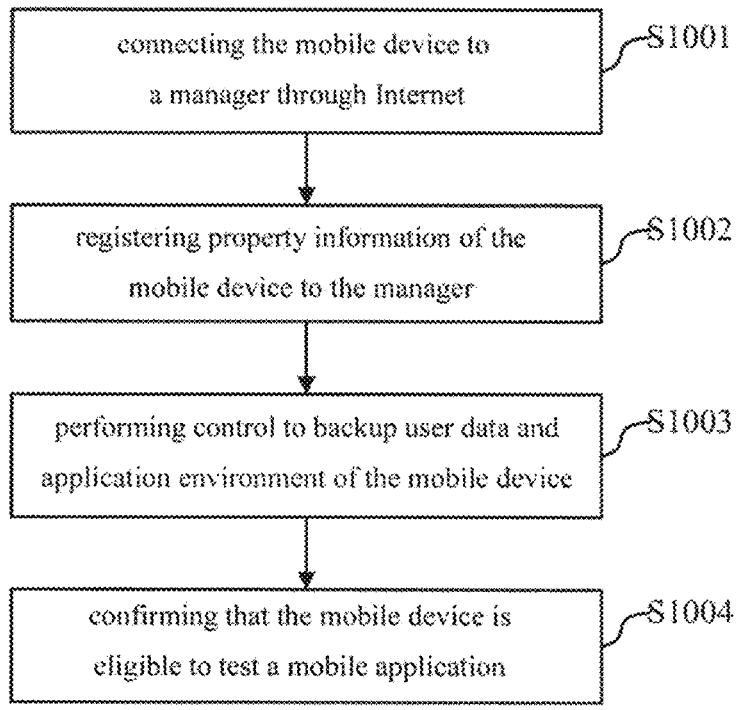
FIG. 10 is a flowchart illustrating a method performed in a mobile device according to an embodiment of the present invention.

FIG. 10 is a flowchart illustrating a method performed in a mobile device according to an embodiment of the present invention.

As shown in FIG. 10, at the step S1001, the mobile device 600 is connected to a manager 500 through the Internet. At the step S1002, (property) information of the mobile device 600 is registered to the manager 500. At the step S1003, a security control is performed to backup user data and application environment of the mobile device 600 to the cloud side or a local computer. At the step S1004, it is confirmed that the mobile device 600 is eligible to test a mobile application.

According to an embodiment of the present invention, before the step S1004 is performed, the method can also comprise a step of refreshing (removing) user data and application environment of the mobile device 600 according to requirements. In other words, after the user data and application environment of the mobile device 600 are backed up to the cloud side or the local computer, the user data and the application environment data on the mobile device 600 are removed.

According to an embodiment of the present invention, the above method can also comprise a step of removing the SIM card and/or the external extended memory card from the mobile device 600. In other words, in order to ensure that the private data of the mobile device 600 would not leak out, before starting the test operation of the mobile application, the SIM card and/or the external extended memory card are removed from the mobile device 600.

Figure 11:
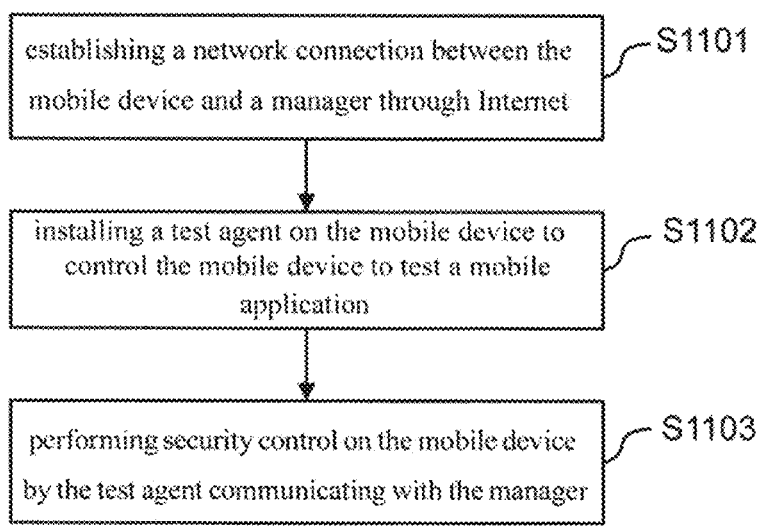
FIG. 11 is a flowchart illustrating a method performed in a mobile device according to another embodiment of the present invention.

FIG. 11 is a flowchart illustrating a method performed in a mobile device according to another embodiment of the present invention.

As shown in FIG. 11, at the step S1101, a connection between the mobile device 600 and a manager 500 is established through the Internet. At the step S1102, a test agent is installed on the mobile device 600 to control the mobile device 600 to test a mobile application. At the step S1103, a security control is performed on the mobile device 600 by the test agent communicating with the manager 500.

According to an embodiment of the present invention, the above method can also comprise a step of configuring resources of the mobile device 600 that can be accessed by the mobile application to be tested. In other words, the resources in the mobile device 600 are configured by the access permission configuration module 603, and for resources such as private data needing security control, their security level should be configured to prohibit being accessed by the mobile application to be tested.

According to an embodiment of the present invention, the above method can also comprise a step of backing up user data and application environment of the mobile device to the cloud side or a local computer before the test, and recovering the backed up user data and application environment after the test.

According to an embodiment of the present invention, the above method can also comprise a step of monitoring the state, the test time, and the resource consumption of the mobile device 600 performing test on the mobile application, and sending result data to the manager 500.

According to an embodiment of the present invention, the above method can also comprise at least one of the following steps: configuring service time available for testing of the mobile device 600; receiving the mobile application to be tested; installing the mobile application to be tested into the mobile device 600; initiating the mobile application; controlling test script files of the mobile application; interrupting or terminating the test according to monitored exceptions; removing the mobile application from the mobile device 600.

According to an embodiment of the present invention, the above method can also comprise at least one of the following steps: recovering the user data and the application environment of the mobile device 600 after the test is finished; confirming receiving the fee paid by the manager 500.

Figure 12:
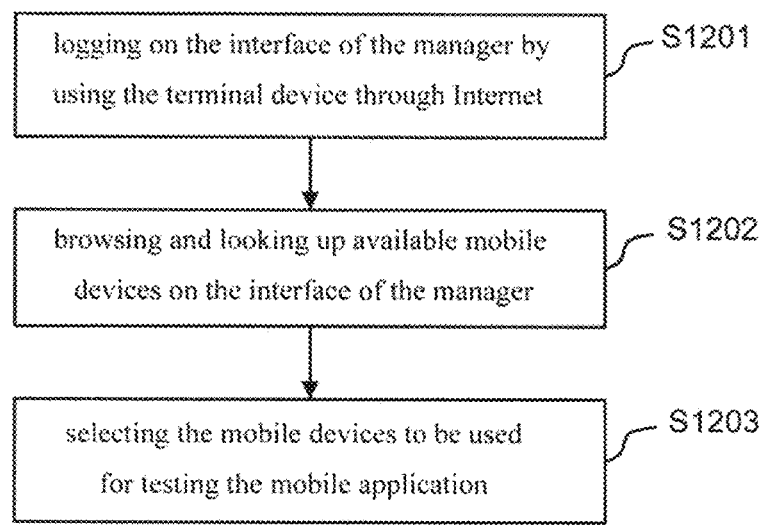
FIG. 12 is a flowchart illustrating a method performed in a terminal device of a tester according to an embodiment of the present invention.

FIG. 12 is a flowchart illustrating a method performed in a terminal device of a tester for testing the mobile application according to an embodiment of the present invention.

As shown in FIG. 12, at the step S1201, logging on the interface of the manager 500 by using a browser of the terminal device 700 through the Internet. At the step S1202, browsing and looking up available mobile devices 600 on the interface of the manager 500. At the step S1203, selecting the mobile devices 600 to be used for testing the mobile application.

According to an embodiment of the present invention, the above method can also comprises a step of obtaining a test report from the manager 500.

According to an embodiment of the present invention, the above method can also comprises a step of paying the manager 500 and/or providers of the mobile devices 600.

In the cloud system for testing mobile applications according to embodiments of the present invention, both automatic testing and manual testing can be performed. In the automatic testing, the user only selects the type and the number of mobile devices without manually controlling the devices; client agents (e.g., test agents) automatically perform the test; it is possible to provide good security protection for the mobile devices of the mobile device providers, without leaking out private data; after the testing is finished, the application environment of the mobile devices is kept clean. In the manual testing, the user connects the mobile device remotely and manually performs the test; because the tester could control the mobile device, it is possible to backup and clean private data before the test manually or automatically, and recover the private data manually or automatically after the test is finished.

In an embodiment of the present invention, for different types of mobile devices, the functions of the security module can be designed accordingly to realize corresponding security protection, as shown in Table 1.

TABLE 1

| Device Type | Security Requirement | Remarks |
|---|---|---|
| Old and unused mobile phone and pad computer | Low | No privacy, seldom use |
| Pad computer only for entertainment | Medium | Limited privacy, only online purchase application, information are protected |
| In-use mobile device | High | Lots of private data, all necessary application programs and data are protected |

Figure 13:
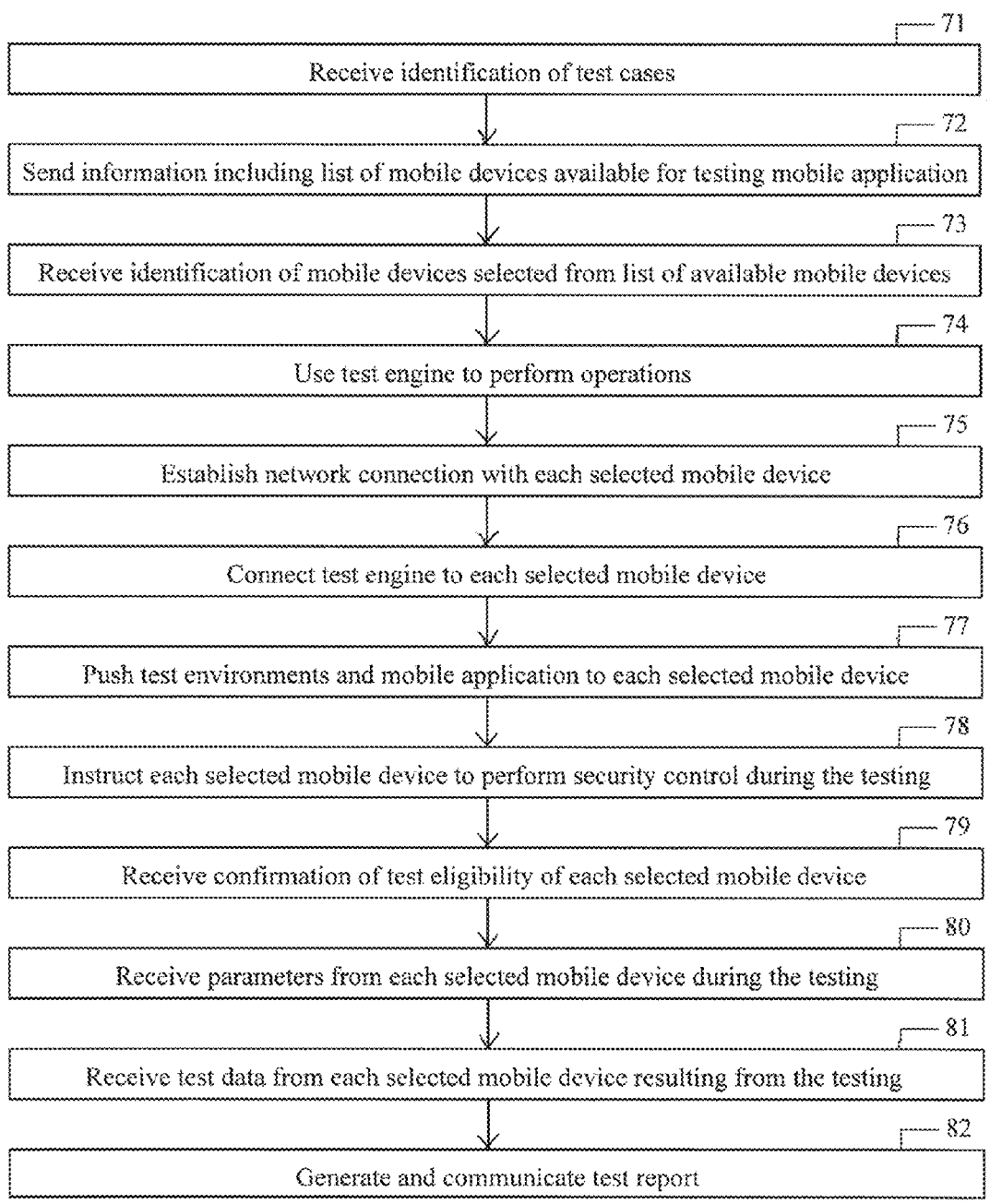
FIG. 13 is a flowchart illustrating a method for testing a mobile application on mobile devices, in accordance with embodiments of the present invention.

FIG. 13 is a flowchart illustrating a method for testing a mobile application on mobile devices, in accordance with embodiments of the present invention. The flow chart of FIG. 13 comprises steps 71-82 in which a first computer comprises the manager 500 and a second computer represents the terminal device 700.

In step 71, the first computer receives, from a second computer, an identification of test cases that specify types of available mobile devices and a number of available mobile devices to be selected by the second computer for testing the mobile application.

In step 72, in response to having received the identification of test cases from the second computer, the first computer sends, to the second computer, information comprising a list of mobile devices available for testing the mobile application.

In one embodiment, the information sent by the first computer to the second computer further comprises data content selected from the group consisting of model of the available mobile devices, distribution area in which of the available mobile devices are distributed, a range of available time of the available mobile devices for testing the mobile application, and combinations thereof.

In step 73, the first computer receives, from the second computer, an identification of mobile devices selected, by the second computer, from the list of multiple mobile devices sent by the first computer to the second computer.

In one embodiment, the selected mobile devices were selected based on some or all of the information sent by the first computer to the second computer in step 72.

In step 74, in response to having received the identification of the selected mobile devices, the first computer uses a test engine to perform operations comprising: identifying test platform requirements of each test case, configuring test environments for each test case based on the test platform requirements, and assigning the mobile application to be tested and the test cases to each selected mobile device.

In step 75, the first computer establishes a network connection between the first computer and each selected mobile device.

In step 76, the first computer connects the test engine to each selected mobile device.

In step 77, the first computer pushes the test environment for each test case and the mobile application to each selected mobile device.

In step 78, the first computer instructs a test agent in each selected mobile device to perform security control on each selected mobile device during testing of the mobile application by each selected mobile device.

In step 79, the first computer receives confirmation from each selected mobile device that each selected mobile device is eligible to test the mobile application.

In step 80, the first computer receives, from each selected mobile device during testing of the mobile application by each selected mobile device, parameters comprising: test time duration of the testing, temperature of each selected mobile device, and electric power consumed by each selected mobile device.

In step 81, the first computer receives test data, from each selected mobile device, resulting from the testing of the mobile application by each selected mobile device.

In step 82, the first computer generates a report based on the test data received from each selected mobile device. In addition, the first computer provides the test report to the second computer.

A computer program product of the present invention comprises one or more computer readable storage devices storing computer readable program code, said program code containing instructions which, upon being executed by one or more computers, implements the methods of the present invention.

A system of the present invention comprises a first computer, one or more processors, one or more memories, and one or more computer readable storage devices, said storage devices containing program code which, upon being executed by the one or more processors via the one or more memories, implements the methods of the present invention. The first computer comprises a processor of the one or more processors, a memory of the one or more memories, and a storage device of the one or more storage devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for testing a mobile application on mobile devices, said method comprising:

receiving, by a first computer, an identification of test cases that specify types of available mobile devices and a number of available mobile devices to be selected by the second computer for testing the mobile application;

in response to said receiving the identification of test cases from the second computer, said first computer sending, to the second computer, information comprising a list of mobile devices available for being tested;

said first computer receiving, from the second computer, an identification of mobile devices selected, by the second computer, from the list of multiple mobile devices sent by the first computer to the second computer;

in response to said receiving the identification of the selected mobile devices, said first computer using a test engine to perform operations comprising identifying test platform requirements of each test case, configuring test environments for each test case based on the test platform requirements, and assigning the mobile application to be tested and the test cases to each selected mobile device;

said first computer establishing a network connection between the first computer and each selected mobile device;

said first computer connecting the test engine to each selected mobile device;

said first computer pushing the test environment for each test case and the mobile application to each selected mobile device;

said first computer receiving confirmation from each selected mobile device that each selected mobile device is eligible to test the mobile application; and said first computer receiving test data, from each selected mobile device, resulting from testing the mobile application by each selected mobile device.

2. The method of claim 1, said method further comprising:
said first computer generating a report based on the test data received from each selected mobile device; and
said first computer providing the test report to the second computer.

3. The method of claim 1, wherein the information sent by the first computer to the second computer further comprises data content selected from the group consisting of model of the available mobile devices, distribution area in which of the available mobile devices are distributed, a range of available time of the available mobile devices for testing the mobile application, and combinations thereof.

4. The method of claim 3, wherein the selected mobile devices were selected based on some or all of the information sent by the first computer to the second computer.

5. The method of claim 1, said method further comprising:
said first computer receiving, from each selected mobile device during said testing the mobile application by each selected mobile device: parameters comprising test time duration of said testing, temperature of each selected mobile device, and electric power consumed by each selected mobile device.

6. The method of claim 1, said method further comprising:
said first computer instructing a test agent in each selected mobile device to perform security control on each selected mobile device during said testing the mobile application by each selected mobile device.

7. The method of claim 1, said method further comprising:
said first computer receiving confirmation from each selected mobile device that each selected mobile device is eligible to test the mobile application.

8. A computer program product, comprising: one or more computer readable storage devices storing computer readable program code, said program code containing instructions which, upon being executed by one or more computers that comprise a first computer, implements a method for testing a mobile application on mobile devices, said method comprising:

receiving, by the first computer, an identification of test cases that specify types of available mobile devices and a number of available mobile devices to be selected by the second computer for testing the mobile application;

in response to said receiving the identification of test cases from the second computer, said first computer sending, to the second computer, information comprising a list of mobile devices available for being tested;

said first computer receiving, from the second computer, an identification of mobile devices selected, by the second computer, from the list of multiple mobile devices sent by the first computer to the second computer;

in response to said receiving the identification of the selected mobile devices, said first computer using a test engine to perform operations comprising identifying test platform requirements of each test case, configuring test environments for each test case based on the test platform requirements, and assigning the mobile application to be tested and the test cases to each selected mobile device;

said first computer establishing a network connection between the first computer and each selected mobile device;

said first computer connecting the test engine to each selected mobile device;

said first computer pushing the test environment for each test case and the mobile application to each selected mobile device;

said first computer receiving confirmation from each selected mobile device that each selected mobile device is eligible to test the mobile application; and said first computer receiving test data from each selected mobile device from testing the mobile application by each selected mobile device.

9. The computer program product of claim 8, said method further comprising:
said first computer generating a report based on the test data received from each selected mobile device; and
said first computer providing the test report to the second computer.

10. The computer program product of claim 8, wherein the information sent by the first computer to the second computer further comprises data content selected from the group consisting of model of the available mobile devices, distribution area in which of the available mobile devices are distributed, a range of available time of the available mobile devices for testing the mobile application, and combinations thereof.

11. The computer program product of claim 10, wherein the selected mobile devices were selected based on some or all of the information sent by the first computer to the second computer.

12. The computer program product of claim 8, said method further comprising:
said first computer receiving, from each selected mobile device during said testing the mobile application by each selected mobile device: parameters comprising test time duration of said testing, temperature of each selected mobile device, and electric power consumed by each selected mobile device.

13. The computer program product of claim 8, said method further comprising:
said first computer instructing a test agent in each selected mobile device to perform security control on each selected mobile device during said testing the mobile application by each selected mobile device.

14. The computer program product of claim 8, said method further comprising:
said first computer receiving confirmation from each selected mobile device that each selected mobile device is eligible to test the mobile application.

15. A system, comprising a first computer, one or more processors, one or more memories, and one or more computer readable storage devices, said storage devices containing program code which, upon being executed by the one or more processors via the one or more memory, implements a method for testing a mobile application on mobile devices, said first computer comprising a processor of the one or more processors, a memory of the one or more memories, and a storage device of the one or more storage devices, said method comprising:

receiving, by the first computer, an identification of test cases that specify types of available mobile devices and a number of available mobile devices to be selected by the second computer for testing the mobile application, wherein the computer system comprises the first computer, and wherein;

in response to said receiving the identification of test cases from the second computer, said first computer sending, to the second computer, information comprising a list of mobile devices available for being tested;

said first computer receiving, from the second computer, an identification of mobile devices selected, by the second computer, from the list of multiple mobile devices sent by the first computer to the second computer;

in response to said receiving the identification of the selected mobile devices, said first computer using a test engine to perform operations comprising identifying test platform requirements of each test case, configuring test environments for each test case based on the test platform requirements, and assigning the mobile application to be tested and the test cases to each selected mobile device;

said first computer establishing a network connection between the first computer and each selected mobile device;

said first computer connecting the test engine to each selected mobile device;

said first computer pushing the test environment for each test case and the mobile application to each selected mobile device;

said first computer receiving confirmation from each selected mobile device that each selected mobile device is eligible to test the mobile application; and said first computer receiving test data from each selected mobile device from testing the mobile application by each selected mobile device.

16. The system of claim 15, said method further comprising:
said first computer generating a report based on the test data received from each selected mobile device; and
said first computer providing the test report to the second computer.

17. The system of claim 15, wherein the information sent by the first computer to the second computer further comprises data content selected from the group consisting of model of the available mobile devices, distribution area in which of the available mobile devices are distributed, a range of available time of the available mobile devices for testing the mobile application, and combinations thereof.

18. The system of claim 17, wherein the selected mobile devices were selected based on some or all of the information sent by the first computer to the second computer.

19. The system of claim 15, said method further comprising:
said first computer receiving, from each selected mobile device during said testing the mobile application by each selected mobile device: parameters comprising test time duration of said testing, temperature of each selected mobile device, and electric power consumed by each selected mobile device.

20. The system of claim 15, said method further comprising:
said first computer instructing a test agent in each selected mobile device to perform security control on each selected mobile device during said testing the mobile application by each selected mobile device.

* * * * *